US009086015B2

United States Patent
LaForce et al.

(10) Patent No.: US 9,086,015 B2
(45) Date of Patent: Jul. 21, 2015

(54) OXY-COMBUSTION TURBOEXPANDER SYSTEM

(75) Inventors: Craig LaForce, Missouri City, TX (US); Bhadra S. Grover, Sugar Land, TX (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 696 days.

(21) Appl. No.: 13/451,072

(22) Filed: Apr. 19, 2012

(65) Prior Publication Data

US 2013/0227961 A1 Sep. 5, 2013

Related U.S. Application Data

(60) Provisional application No. 61/605,469, filed on Mar. 1, 2012.

(51) Int. Cl.
| | |
|---|---|
| *F25J 3/04* | (2006.01) |
| *F02C 3/20* | (2006.01) |
| *F02C 3/34* | (2006.01) |
| *F01K 23/06* | (2006.01) |
| *F23C 9/00* | (2006.01) |
| *F01K 23/10* | (2006.01) |
| *F02C 6/18* | (2006.01) |
| *F22B 1/18* | (2006.01) |

(52) U.S. Cl.
CPC ............... *F02C 3/20* (2013.01); *F25J 3/04533* (2013.01); *F25J 3/04563* (2013.01); *F01K 23/068* (2013.01); *F01K 23/10* (2013.01); *F02C 3/34* (2013.01); *F02C 6/18* (2013.01); *F22B 1/1815* (2013.01); *F23C 9/00* (2013.01); *F25J 2205/66* (2013.01); *F25J 2240/80* (2013.01); *F25J 2260/80* (2013.01); *Y02E 20/16* (2013.01)

(58) Field of Classification Search
CPC ................ F02C 3/20; F02C 3/34; F02C 6/18; F23C 9/00; F01K 23/068; F01K 23/10; Y02E 20/16; F22B 1/1815; F25J 3/04533; F25J 3/04563; F25J 2205/66; F25J 2240/80; F25J 2260/80
See application file for complete search history.

(56) References Cited

U.S. PATENT DOCUMENTS

| | | | | |
|---|---|---|---|---|
| 4,434,613 | A * | 3/1984 | Stahl ............................... | 60/784 |
| 2002/0174659 | A1* | 11/2002 | Viteri et al. ..................... | 60/780 |
| 2004/0221581 | A1* | 11/2004 | Viteri ............................. | 60/774 |

* cited by examiner

*Primary Examiner* — William H Rodriguez
(74) *Attorney, Agent, or Firm* — Elwood L. Haynes

(57) ABSTRACT

An integrated oxy-combustion turboexpander process including producing an enriched carbon dioxide product stream, by combusting a compressed synthetic air stream, including an oxygen-enriched stream and a carbon dioxide recycle stream, with a fuel stream and expanding the combustion stream thereby producing the carbon dioxide recycle stream and an enriched carbon dioxide product stream; producing an essentially pure carbon dioxide product stream, by processing the enriched carbon dioxide product stream into a deoxo methane combustor.

17 Claims, 1 Drawing Sheet

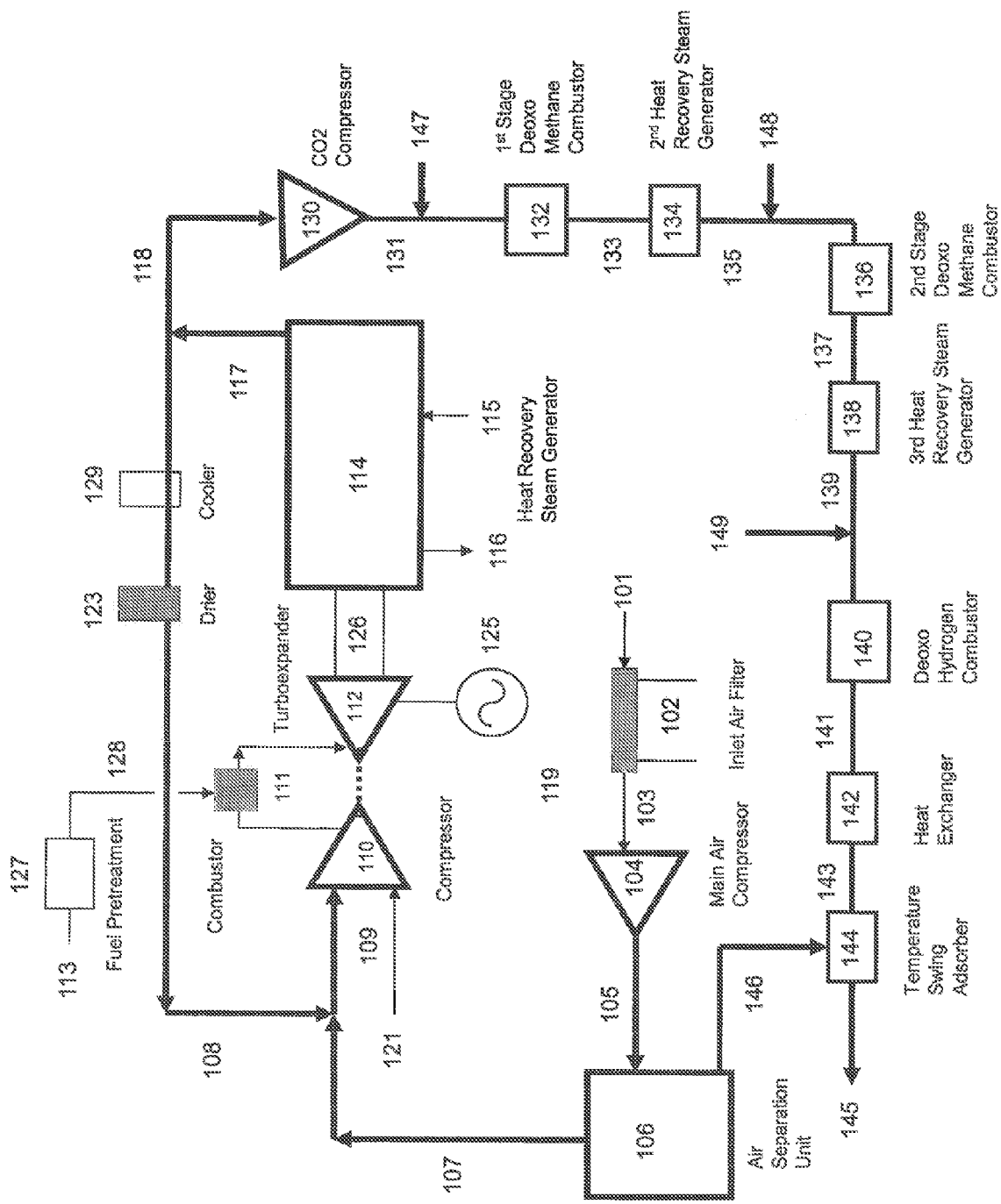

OXY-COMBUSTION TURBOEXPANDER SYSTEM

CROSS-REFERENCE TO RELATED APPLICATIONS

This application claims the benefit of U.S. Provisional Application No. 61/605,469, filed Mar. 1, 2012, the entire contents of which are incorporated herein by reference.

BACKGROUND

The products of air separation units can be used in various power generation schemes and can enhance the performance of existing power generation systems. Such products may therefore play key roles in the high-efficiency, low or zero-emission power generation schemes of the future. For example, oxygen and oxygen-enriched air have been demonstrated to enhance combustion, increase production, and reduce emissions. Oxy-combustion also has the inherent advantage of producing a CO2-rich flue gas, which can be more easily processed to produce a pure CO2 Product stream than flue gas from air-blown processes. With the increasing interest in global climate change, as well as the beneficial role CO2 can play in enhanced oil recovery, more attention will undoubtedly be focused on technologies that facilitate the capture of CO2. The greater ease with which CO2-rich flue gas produced by oxy-combustion may be processed to capture CO2 therefore suggests that the further development of this technology would be beneficial.

SUMMARY

An integrated oxy-combustion turboexpander process including producing an enriched carbon dioxide product stream, by combusting a compressed synthetic air stream, including an oxygen-enriched stream and a carbon dioxide recycle stream, with a fuel stream and expanding the combustion stream thereby producing the carbon dioxide recycle stream and an enriched carbon dioxide product stream; producing an essentially pure carbon dioxide product stream, by processing the enriched carbon dioxide product stream into a deoxo methane combustor.

An integrated oxy-combustion turboexpander process including producing an enriched carbon dioxide products stream, by combining a carbon dioxide recycle stream and an oxygen-enriched stream thereby producing a synthetic air stream, introducing the synthetic air stream into a first compressor, thereby producing a compressed synthetic air stream, introducing the compressed synthetic air stream into a combustor, along with a fuel stream, thereby producing a combustion product stream, introducing the combustion product stream into a turboexpander thereby producing power and a exhaust gas stream, separating the exhaust gas stream into the carbon dioxide recycle stream and an enriched carbon dioxide product stream. And producing an essentially pure carbon dioxide product stream, by introducing the enriched carbon dioxide product stream into a second compressor, thereby producing a compressed carbon dioxide stream, introducing the compressed carbon dioxide steam along with a methane stream into a first deoxo methane combustor, thereby producing a carbon dioxide stream with reduced oxygen, introducing the carbon dioxide stream with reduced oxygen into a first heat transfer device, thereby producing a cooled carbon dioxide stream with reduced oxygen, introducing the cooled carbon dioxide stream with reduced oxygen into a second deoxo methane combustor, thereby producing a carbon dioxide stream with further reduced oxygen, introducing the carbon dioxide stream with further reduced oxygen into a second heat transfer device, thereby producing a cooled carbon dioxide stream with further reduced oxygen, introducing the cooled carbon dioxide stream with further reduced oxygen into a water removal device, thereby producing an essentially pure carbon dioxide product stream.

BRIEF DESCRIPTION OF THE DRAWINGS

The invention may be understood by reference to the following description taken in conjunction with the accompanying drawings, and in which:

FIG. 1 illustrates a schematic representation in accordance with one embodiment of the present invention.

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1, an oxy-combustion turboexpander process and apparatus is provided. Under steady state operation, inlet air 101 is introduced into inlet air filter 102. Filtered air stream 103 then enters main air compressor (MAC) 104, wherein this filtered inlet air is pressurized into feed stream 105. Feed stream 105 then enters air separation unit 106. Air separation unit 106 may be of any appropriate design known in the art. Air separation unit 106 produces at least oxygen-enriched stream 107, and a nitrogen-enriched stream 146. Oxygen-enriched stream 107 may have a purity of greater than 97%.

Oxygen-enriched stream 107 is then blended with carbon dioxide-enriched recycle stream 108 (discussed below), thereby producing synthetic air stream 109. Synthetic air stream 109 may contain small amounts of water and excess oxygen. The ratio of oxygen to carbon dioxide may be varied thereby providing design flexibility (impacting molecular weight, temperatures throughout the gas turbine and mass flow through the unit), the recycle stream may be recycled at flue gas temperatures above the dew point of water to potentially increase efficiency and avoid corrosion concerns of wet CO2, or as a stream that is cooled to near ambient temperature. The molecular weight of the synthetic air will ordinarily be greater than atmospheric air, and also have a different heat capacity. Both these variables may impact the design and optimal operating pressure of the gas compressor-turbine aerodynamic components, which are readily calculated by known compressor technology, avoiding the need for undue experimentation.

Synthetic air stream 109 is introduced to compressor 110. The compressed synthetic air stream is then introduced into combustor 111. Fuel stream 128 may be directly introduced into combustor 111, which then produces a compressed combustion stream. Fuel stream 113 may be pretreated 127 to produce a pretreated fuel stream 128 substantially free of nitrogen. This combustion stream is introduced into turboexpander 112, thereby producing power 125 and hot exhaust gas stream 126.

Hot exhaust gas stream 126 is directed to heat recovery steam generator 114, which takes boiler feed water stream 115 and produces steam stream 116. After the heat exchange within heat recovery steam generator 114, hot exhaust gas stream 126 is cooled and exits as cooled exhaust gas stream 117. Cooled exhaust gas stream 117 may have a carbon dioxide purity of over 93%. A first portion of cooled exhaust gas stream 117 may be exported as enriched carbon dioxide product stream 118, and a second portion may be cooled in cooler 129 and/or dried in drier 123, after which it becomes carbon dioxide-enriched recycle stream 108.

Enriched carbon dioxide product stream 118 is then introduced into CO2 compressor 130. CO2 compressor 130 may have a single stage intercooler. CO2 compressor 130 may have no aftercooler. CO2 compressor 130 may have a discharge pressure of 100 psig, and a discharge temperature of 200 F.

Compressed enriched carbon dioxide stream 131 is then introduced, along with methane stream 147, into the first stage of deoxo methane combustor 132. Deoxo methane combustor 132 may have platinum and/or palladium catalyst. Deoxo methane combustor 132 may be of any type known in the art. Deoxo methane combustor 132 may comprise a catalytic oxidizer reactor having one or more beds of a catalyst that is selective for combusting the flammable contaminants contained in the enriched carbon dioxide product stream. Deoxo methane combustor 132 may operate at a temperature that is sufficient to allow for the combustion of the contaminants in the enriched carbon dioxide product stream. This operating temperature may be between about 300° C. and about 700° C. Deoxo methane combustor may be designed, and may operate, as described in the inventor's US Patent Publication 2010-0284892.

The outlet 133 from deoxo methane combustor 132 is the introduced into second heat recovery steam generator 134, wherein the temperature of enriched carbon dioxide stream 135 is reduced.

Enriched carbon dioxide stream 135 is then introduced, along with methane stream 148, into the second stage of deoxo methane combustor 136. Deoxo methane combustor 136 may have platinum and/or palladium catalyst. The outlet 137 from deoxo methane combustor 136 is the introduced into third heat recovery steam generator 138, wherein the temperature of enriched carbon dioxide stream 139 is reduced.

Enriched carbon dioxide stream 139 may then introduced, along with hydrogen stream 149, into deoxo hydrogen combustor 140 Deoxo hydrogen combustor 140 may have platinum and/or palladium catalyst. The outlet 141 from deoxo methane combustor 140 may be introduced into heat exchanger 142, wherein the temperature of enriched carbon dioxide stream 143 is reduced.

Enriched carbon dioxide stream 143 is then introduced into activated alumina temperature swing adsorption unit 144, wherein water is removed and vented, and essentially pure carbon dioxide stream 145 is produced for export, or for internal plant use. Essentially pure carbon dioxide stream 145 may have less than 0.5% oxygen by weight. Activated alumina temperature swing adsorption unit 144 may be regenerated with nitrogen-enriched stream 146.

In one embodiment, air inlet stream 121 may be added to compressor section 110 of gas turbine 124, during start up. Then once steady state operation has been achieved, air inlet stream 121 may be switched for synthetic air stream 109. The use of air inlet stream 121 may be continued should the ASU trip, or be out of commission for planned or unplanned outages.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. An integrated oxy-combustion turboexpander process comprising:
    a) producing an enriched carbon dioxide product stream, by combusting a compressed synthetic air stream, comprising an oxygen-enriched stream and a carbon dioxide recycle stream, with a fuel stream and expanding said combustion stream thereby producing said carbon dioxide recycle stream and an enriched carbon dioxide product stream;
    b) producing an essentially pure carbon dioxide product stream, by processing said enriched carbon dioxide product stream into a deoxo methane combustor.

2. The integrated oxy-combustion turboexpander process of claim 1, further comprising at least two deoxo methane combustors in series.

3. The integrated oxy-combustion turboexpander process of claim 1, wherein;
    i. said compressed synthetic air stream is compressed in a first compressor,
    ii. said synthetic air stream and said fuel stream are combusted in a combustor,
    iii. said combustion stream is expanded in a turboexpander, and
    iv. wherein said first compressor, said combustor, and said turboexpander comprise a gas turbine.

4. The integrated oxy-combustion turboexpander process of claim 1, wherein;
    said compressed synthetic air stream is compressed in a first compressor,
        i. said synthetic air stream and said fuel stream are combusted in a combustor,
        ii. said combustion stream is expanded in a turboexpander, and
        iii. wherein said first compressor, said combustor, and said turboexpander are discrete.

5. The integrated oxy-combustion turboexpander process of claim 1, wherein
    i. said deoxo methane combustor comprises a catalytic oxidizer reactor having one or more beds of a catalyst that is selective for combusting the flammable contaminants contained in said enriched carbon dioxide product stream, and wherein
    ii. said essentially pure carbon dioxide product stream is produced by injecting said enriched carbon dioxide product stream, along with a methane containing stream, into the catalytic oxidizer reactor at a temperature that is sufficient to allow for the combustion of the contaminants in said enriched carbon dioxide product stream.

6. The integrated oxy-combustion turboexpander process of claim 5, wherein said enriched carbon dioxide product stream and said methane containing stream are injected into the catalytic oxidizer reactor at a temperature of between about 300° C. and about 700° C.

7. The integrated oxy-combustion turboexpander process of claim 1, wherein said enriched carbon dioxide products stream is compressed in a second compressor prior to introduction into the deoxo methane combustor.

8. The integrated oxy-combustion turboexpander process of claim 7, wherein said first compressor and said second compressor comprise a single machine.

9. The integrated oxy-combustion turboexpander process of claim 1, wherein said enriched carbon dioxide product stream is introduced into one or more deoxo methane combustors, followed by one or more deoxo hydrogen combustors, thereby producing said essentially pure carbon dioxide product stream.

10. An integrated oxy-combustion turboexpander process comprising:
    a) producing an enriched carbon dioxide products stream, by
        i. combining a carbon dioxide recycle stream and an oxygen-enriched stream thereby producing a synthetic air stream,
        ii. introducing said synthetic air stream into a first compressor, thereby producing a compressed synthetic air stream,
        iii. introducing said compressed synthetic air stream into a combustor, along with a fuel stream, thereby producing a combustion product stream,
        iv. introducing said combustion product stream into a turboexpander thereby producing power and a exhaust gas stream,
        v. separating said exhaust gas stream into said carbon dioxide recycle stream and an enriched carbon dioxide product stream;
    b) producing an essentially pure carbon dioxide product stream, by
        i. introducing said enriched carbon dioxide product stream into a second compressor, thereby producing a compressed carbon dioxide stream,
        ii. introducing said compressed carbon dioxide steam along with a methane stream into a first deoxo methane combustor, thereby producing a carbon dioxide stream with reduced oxygen,
        iii. introducing said carbon dioxide stream with reduced oxygen into a first heat transfer device, thereby producing a cooled carbon dioxide stream with reduced oxygen,
        iv. introducing said cooled carbon dioxide stream with reduced oxygen into a second deoxo methane combustor, thereby producing a carbon dioxide stream with further reduced oxygen,
        v. introducing said carbon dioxide stream with further reduced oxygen into a second heat transfer device, thereby producing a cooled carbon dioxide stream with further reduced oxygen,
        vi. introducing said cooled carbon dioxide stream with further reduced oxygen into a water removal device, thereby producing an essentially pure carbon dioxide product stream.

11. The integrated oxy-combustion turboexpander process of claim 10, wherein;
    i. said compressed synthetic air stream is compressed in the first compressor,
    ii. said synthetic air stream and said fuel stream are combusted in the combustor,
    iii. said combustion stream is expanded the turboexpander, and
    iv. wherein said first compressor, said combustor, and said turboexpander comprise a gas turbine.

12. The integrated oxy-combustion turboexpander process of claim 10, wherein;
    i. said compressed synthetic air stream is compressed in a first compressor,
    ii. said synthetic air stream and said fuel stream are combusted in a combustor,
    iii. said combustion stream is expanded in a turboexpander, and
    iv. wherein said first compressor, said combustor, and said turboexpander are discrete.

13. The integrated oxy-combustion turboexpander process of claim 10, wherein
    i. said first deoxo methane combustor and said second deoxo methane combustor comprise a catalytic oxidizer reactor having one or more beds of a catalyst that is selective for combusting the flammable contaminants contained in said enriched carbon dioxide product stream, and wherein
    ii. said essentially pure carbon dioxide product stream is produced by injecting said enriched carbon dioxide product stream, along with a methane containing stream, into the catalytic oxidizer reactor at a temperature that is sufficient to allow for the combustion of the contaminants in said enriched carbon dioxide product stream.

14. The integrated oxy-combustion turboexpander process of claim 13, wherein said enriched carbon dioxide product stream and said methane containing stream are injected into the catalytic oxidizer reactor at a temperature of between about 300° C. and about 700° C.

15. The integrated oxy-combustion turboexpander process of claim 10, wherein said enriched carbon dioxide products stream is compressed in a second compressor prior to introduction into said first deoxo methane combustor.

16. The integrated oxy-combustion turboexpander process of claim 15, wherein said first compressor and said second compressor comprise a single machine.

17. The integrated oxy-combustion turboexpander process of claim 1, wherein said enriched carbon dioxide product stream is introduced into said first deoxo methane combustor and said second deoxo methane combustor, followed by one or more deoxo hydrogen combustors, thereby producing said essentially pure carbon dioxide product stream.

* * * * *